3,208,009
LASER WITH YTTERBIUM ACTIVATED GLASS
SENSITIVE ELEMENT
Howard W. Etzel and Harold W. Gandy, Forest Heights, and Robert J. Ginther, Temple Hills, Md., assignors to the United States of America as represented by the Secretary of the Navy
Filed Apr. 30, 1962, Ser. No. 191,381
6 Claims. (Cl. 331—94.5)
(Granted under Title 35, U.S. Code (1952), sec. 266)

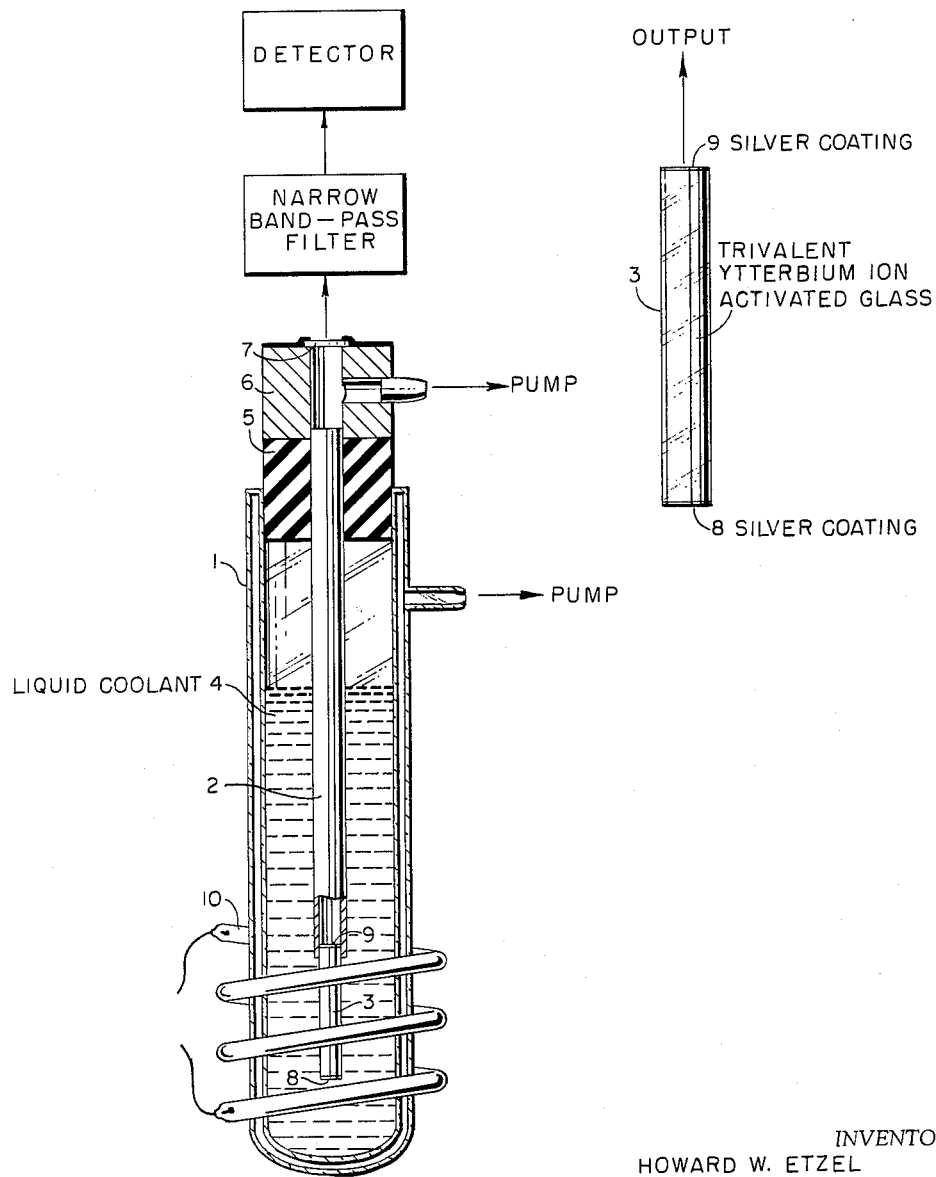

The invention described herein may be manufactured and used by and for the Government of the United States of America for governmental purposes without the payment of any royalties thereon or therefor.

This invention relates to lasers, more particularly to new sensitive elements therefor.

The laser (light amplification by stimulated emission of radiation), sometimes also referred to as optical maser, is a device capable of producing coherent radiation in the visible and infrared regions of the spectrum. The prime component of the laser is the sensitive element or medium. The sensitive element is constituted of activator ions in a suitable matrix and in operation of the laser absorbs optical energy which pumps electrons from a ground state to a higher energy level, populating the higher level with electrons. The system so created is an unstable energy state in which the excited electrons quickly begin return to the ground level. In the process of so returning, the electrons fall from the metastable or excited state to the ground or terminal state yielding normal luminescence. However, if the population of the excited state exceeds that of the terminal state, then stimulated emission of radiation can occur. By trapping most of the stimulated emission in the sensitive element and oscillating it therein, further stimulated emission of radiation takes place with a regenerative build up in intensity. The further stimulated emission is always in phase with the exciting radiation. The sensitive element operates as a resonant cavity and only those modes of oscillation which are the natural modes for the system can be bulit up to enhance coherent radiation. The resonator used currently in laser work is of conventional Fabray-Perot construction in which the sensitive element is a rod having its ends quite flat and parallel and coated with a film of silver for reflecting and trapping the radiation. The silver coating at one end is thinner in order to provide a small amount of transmission of the coherent radiation from the sensitive element as the output of the laser. The optical pumping energy is flashed to the open sides of the sensitive element from a suitable high intensity source, for example, a xenon flash tube which surrounds the sensitive element.

The laser concept has been heretofore demonstrated for the following ions, trivalent chromium in corundum (ruby), trivalent uranium in calcium fluoride, divalent samarium in calcium fluoride, all of which are single crystals, and recently, neodymium in clad fibers of barium crown glass.

A serious limitation on the use of the laser, both as an amplifier and as an oscillator, is that the operating frequencies of the sensitive elements cannot be significantly changed. They emit only in a characteristic and limited bandwith. Thus, in order to widen the frequency operating base for lasers, it is necessary to provide sensitive elements which will emit light at frequencies which are different than those heretofore known.

We have found that a new class of luminescent solids which are sensitive elements for lasers to be clear glasses which are activated with trivalent ytterbium ions to absorb optical pumping energy and exhibit stimulated emission of radiation and which further are shaped to a regenerative optical configuration. We have found clear glasses activated with trivalent ytterbium which, as the sensitive element of the laser, emit at wavelengths of stimulated radiation different than any heretofore reported. In particular, we have found a trivalent ytterbium activated clear glass which in laser action emits at least 29 different monochromatic wavelengths in a closely spaced band which has its optical center at 1.015 microns in the near infrared region of the spectrum. We have also found the first instance in which the sensitive element of the laser can be pumped entirely in the infrared spectral region. The new sensitive elements, being glasses, have the inherent advantages over single crystals of lower cost in production and of being made available in a wider variety of sizes and shapes, in particular, those of large dimensions.

A more complete understanding of the invention is had by reference to the following description and the accompanying drawing in which:

FIG. 1 is a view, partly in section, of an apparatus for conducting laser action, and FIG. 2 is a view of a new sensitive element in accordance with the invention.

Referring to FIGURE 1, the apparatus there shown is designed for conducting laser activity at low temperatures, e.g., at liquid nitrogen or liquid helium temperatures. A double-wall glass vessel 1 of the Dewar type, equipped with an outlet for evacuation of the space between the walls, is provided for holding the liquid coolant 4. A metal tube 2 is mounted in the vessel 1 by means of a rubber plug 5 through which it passes to terminate in the tubular passage of a metal suction head 6 wherein it is held by a sweated solder connection. The rubber plug 5 also serves to seal the vessel 1 against access of the atmosphere. The new glass sensitive element 3 is held in the lower end of the metal tube 2 by friction fit and atmospheric pressure and extends therebelow to be immersed in the liquid coolant 4. A small amount of silicone grease wiped over the junction of the sensitive element and the tube insures a vaccum tight seal at this joint. The passage through the suction head 6 is covered by a sapphire window 7 which is sealed to the face of the suction head in gas-tight and, at the sides, in light tight relationship by a plastic sealant, such as sealing wax, as shown. A suitable optical pumping source for the sensitive element is provided, such as a General Electric type FT503 xenon-filled helical flash tube 10.

The new glass sensitive element appears in enlarged view in FIGURE 2. As shown, it has a regenerative optical configuration by reason of the glass matrix being in the shape of a rod or etalon having the ends cut, ground and polished plane to a high degree of parallelism as in conventional Fabry-Perot configuration. The ends of the glass rod are coated with an evaporated silver film, one of which at 8 is totally reflecting and the other at 9 is transmitting to a few percent to permit delivery of coherent radiation from the laser.

In operation of the apparatus described above, the light source 10 is flashed by a high energy input and that portion of the light which pumps the electrons from the ground state to the higher energy level is absorbed by the sensitive element 3. The output of stimulated coherent radiation from the sensitive element passes through the tube 2 and the sapphire window 7 to the detector which may be an indium-antimony photovoltaic cell operated at appropriate temperature. If desired a narrow bandpass filter may be interposed between the sapphire window and the detector.

A clear high optical quality aluminosilicate glass of the composition in mole percent:

0.6 ytterbium oxide, 29.6 magnesium oxide, 7.4 lithium oxide, 5.7 alumina and 56.7 silica was fabricated into an etalon, 4 mm. in diameter and 24 mm. long, having the ends of the glass rod parallel to within 30 seconds of arc and plane to within a fraction of a wavelength of visible light. The ends of the rod were coated with evaporated silver films the one totally reflecting, and the other transmitting about 2% of the stimulated emission radiation.

An apparatus corresponding in all essentials to that of FIGURE 1 was employed to induce laser action in the trivalent ytterbium ion-containing glass sensitive element and determine the occurrence of stimulated emission of radiation therefrom. Liquid nitrogen was used as the coolant in the Dewar flask 1, which was connected to a vacuum pump for evacuation of the atmosphere from between the double glass walls. The radiation transmitting tube 2 was of stainless steel to which was affixed a sapphire window. The $Yb^{+3}$ containing glass sensitive element 3 was inserted in the lower end of the tube to depend therefrom. This unit was inserted in the Dewar flask with the sensitive element in direct contact with the liquid nitrogen bath and on the axis of the flash tube 10. The interior of the Dewar tube was connected to a vacuum pump through the suction head 6 for constant evacuation. The detector was an InSb photovoltaic cell operated at liquid nitrogen temperature and had a time constant of about two microseconds. Stimulated emission of radiation occurs approximately 750 microseconds after initiating the exciting pulse and persists for about 550 microseconds as observed on an oscilloscope. The stimulated emission does not occur at the peak intensity of the exciting pulse, but commences some 300 microseconds thereafter. The threshold lamp input energy required for the laser action at liquid nitrogen temperature with the defined etalon and this excitation scheme is about 1300 joules and decreases by about 10% in going to liquid helium temperature. The test was repeated at liquid helium temperature and the same general spike-like brusts of stimulated emission are to be observed on the oscilloscope. However, for the same excitation energy input, the peak heights of the oscillations are approximately twice as high and the duration of stimulated emission is half as long at helium temperature compared to liquid nitrogen temperature. The peak power density in stimulated emission in the region of 1.015 microns has been determined to be about 12 watts per cm.$^2$ for the defined etalon.

The trivalent ytterbium ion activated glass is essentially transparent in the visible. It has three absorption bands in the near infrared, peaking at 914, 946 and 976 mu, respectively. The 976 mu absorption is the strongest of the infrared bands. The peak heights, bandwidths and spectral portions of the three infrared bands do not vary significantly with temperature. Excitation measurements show that all three infrared bands lead to spontaneous emission at 1.015 microns, the 914 and 946 mu bands appearing relatively more prominent in the excitation spectrum than in the absorption spectrum.

When a sharp cut red filter, transmitting less than 0.01% light below 600 mu and transparent through 1.2 microns, was interposed between the xenon flash tube and the glass sensitive element, the stimulated emission of the laser was decreased only by a small factor that one would expect because of reflection losses in the filter. From this result and from the excitation spectrum for spontaneous emission, the principal absorption bands giving laser action in the Yb-activated glass are those peaking at 914, 946 and 976 mu.

A photograph of the spectrum of the stimulated emission from the trivalent ytterbium activated glass shows an overall bandwidth for the emission of about 6 mu and at least 29 lines to be present. The shortest wavelength discernible above the film background is at 1.0125 mu and the longest at 1.0184 mu.

The trivalent ytterbium content of the above glass can be raised to about 1.2 mole percent $Yb_2O_3$ and the magnesium content, thereof adjusted downward to about 29 mole percent MgO with similar results being obtained from the clear luminescent glass in absorption spectra and stimulated emission of radiation in conducting laser action at liquid nitrogen and liquid helium temperatures.

A clear soda lime silicate glass containing trivalent ytterbium and of the mole percent composition: 0.6 ytterbium oxide, 13.5 sodium oxide, 13.8 calcium oxide, 0.9 alumina and 71.2 silica when evaluated at liquid nitrogen temperature in the above manner exhibited laser action.

The trivalent ytterbium glasses for the new sensitive elements can be made in conventional way for glass making, using either a reducing or oxidizing atmosphere for both the melting and casting operations.

While the invention has been described herein with reference to certain specific embodiments thereof, it is intended that such shall be taken by way of illustration and not in limitation except as may be defined in the appended claims.

What is claimed is:

1. In a laser, a solid luminescent sensitive element of optical regenerative configuration and consisting essentially of a clear glass activated with trivalent ytterbium ions to absorb optical pumping energy in the near infrared region at wavelengths of from 914 to 974 mu and exhibit stimulated emission of radiation in the near infrared region in a waveband of about 6 mu width which has its optical center at 1.015 microns.

2. In a laser, a solid luminescent sensitive element of optical regenerative configuration and consisting essentially of a clear silicate glass activated with trivalent ytterbium ions to absorb optical pumping energy in the near infrared region at wavelengths of from 914 to 974 mu and exhibit stimulated emission of radiation in the near infrared region in a waveband of about 6 mu width which has its optical center at 1.015 microns.

3. In a laser, a solid luminescent sensitive element of optical regenerative configuration and consisting essentially of a clear alumino-silicate glass activated with trivalent ytterbium ions to absorb optical pumping energy in the near infrared region at wavelengths of from 914 to 974 mu and exhibit stimulated emission of radiation in the near infrared region in a waveband of about 6 mu width which has its optical center at 1.015 microns.

4. In a laser, a solid luminescent sensitive element of optical regenerative configuration and consisting essentially of a clear alumino-silicate glass containing from about 0.6 to 1.2 mole percent ytterbium oxide, about 7.4 mole percent lithium oxide, from about 29 to 29.6 mole percent magnesium oxide, about 5.7 mole percent alumina and about 56.7 mole percent silica.

5. In a laser, a solid luminescent sensitive element of optical regenerative configuration and consisting essentially of a clear alumino-silicate glass containing about 0.6 mole percent ytterbium oxide, about 29.6 mole percent magnesium oxide, about 7.4 mole percent lithium oxide, about 5.7 mole percent alumina and about 56.7 mole percent silica.

6. In a laser, a solid luminescent sensitive element of optical regenerative configuration and consisting essentially of a clear silicate glass containing about 0.6 mole percent ytterbium oxide, about 13.5 mole percent sodium oxide, about 13.8 mole percent calcium oxide, about 0.9 mole percent alumina and about 71.2 mole percent silica.

References Cited by the Examiner

UNITED STATES PATENTS

| | | | |
|---|---|---|---|
| 2,049,765 | 8/36 | Fischer | 252—301.4 |
| 2,097,275 | 10/37 | Fischer | 252—301.4 |
| 2,099,602 | 11/37 | Fischer | 252—301.4 |
| 2,929,922 | 3/60 | Schawlow et al. | |
| 3,079,347 | 2/63 | Garrett et al. | 252—301.4 |
| 3,087,374 | 4/63 | Devlin et al. | 88—1 |

OTHER REFERENCES

Kroger: Some Aspects of the Luminescence of Solids, Elsevier Publishing Co., Inc., New York, 1948, pages 293 and 298.

Snitzer: "Optical Maser Action of Nd+3 in a Barium Crown Glass," Physical Review Letters, vol. 7, No. 12, December 1961, pages 444–446.

TOBIAS E. LEVOW, *Primary Examiner*.

MAURICE A. BRINDISI, *Examiner*.